L. L. KAISER.
SPEED TABLE.
APPLICATION FILED FEB. 15, 1921.

1,401,785. Patented Dec. 27, 1921.

MAXIMUM SPEED TABLE.

50-MILES PER HOUR

| | | | | | | | | | | | |
|---|---|---|---|---|---|---|---|---|---|---|---|
| Imlay | 10 / 12 | 20 / 24 | 30 / 36 | 40 / 48 | 50 / 1-00 | 60 / 1-12 | 70 / 1-24 | 80 / 1-36 | 90 / 1-48 | 100 / 2-00 | 110 / 2-12 |
| 10 / 24 | Cosgrove | 10 / 12 | 20 / 24 | 30 / 36 | 40 / 48 | 50 / 1-00 | 60 / 1-12 | 70 / 1-24 | 80 / 1-36 | 90 / 1-48 | 110 / 2-00 |
| 20 / 48 | 10 / 24 | Rose Creek | 10 / 12 | 20 / 24 | 30 / 36 | 40 / 48 | 50 / 1-00 | 60 / 1-12 | 70 / 1-24 | 80 / 1-36 | 90 / 1-48 |
| 30 / 1-12 | 20 / 48 | 10 / 24 | Winnemucca | 10 / 12 | 20 / 24 | 30 / 36 | 40 / 48 | 50 / 1-00 | 60 / 1-12 | 70 / 1-24 | 80 / 1-36 |
| 40 / 1-36 | 30 / 1-12 | 20 / 48 | 10 / 24 | Golconda | 10 / 12 | 20 / 24 | 30 / 36 | 40 / 48 | 50 / 1-00 | 60 / 1-12 | 70 / 1-24 |
| 50 / 2-00 | 40 / 1-36 | 30 / 1-12 | 20 / 48 | 10 / 24 | Iron Point | 10 / 12 | 20 / 24 | 30 / 36 | 40 / 48 | 50 / 1-00 | 60 / 1-12 |
| 60 / 2-24 | 50 / 2-00 | 40 / 1-36 | 30 / 1-12 | 20 / 48 | 10 / 24 | Valmy | 10 / 12 | 20 / 24 | 30 / 36 | 40 / 48 | 50 / 1-00 |
| 70 / 2-48 | 60 / 2-24 | 50 / 2-00 | 40 / 1-36 | 30 / 1-12 | 20 / 48 | 10 / 24 | Battle Mt. | 10 / 12 | 20 / 24 | 30 / 36 | 40 / 48 |
| 80 / 3-12 | 70 / 2-48 | 60 / 2-24 | 50 / 2-00 | 40 / 1-36 | 30 / 1-12 | 20 / 48 | 10 / 24 | Mosel | 10 / 12 | 20 / 24 | 30 / 36 |
| 90 / 3-36 | 80 / 3-12 | 70 / 2-48 | 60 / 2-24 | 50 / 2-00 | 40 / 1-36 | 30 / 1-12 | 20 / 48 | 10 / 24 | Beowawe | 10 / 12 | 20 / 24 |
| 100 / 4-00 | 90 / 3-36 | 80 / 3-12 | 70 / 2-48 | 60 / 2-24 | 50 / 2-00 | 40 / 1-36 | 30 / 1-12 | 20 / 48 | 10 / 24 | Palisade | 10 / 12 |
| 110 / 4-24 | 100 / 4-00 | 90 / 3-36 | 80 / 3-12 | 70 / 2-48 | 60 / 2-24 | 50 / 2-00 | 40 / 1-36 | 30 / 1-12 | 20 / 48 | 10 / 24 | Carlin |

25-MILES PER HOUR

Leon L. Kaiser
INVENTOR

BY Victor J. Evans
ATTORNEY

WITNESS:

UNITED STATES PATENT OFFICE.

LEON L. KAISER, OF LODI, CALIFORNIA.

SPEED-TABLE.

1,401,785.  Specification of Letters Patent.  Patented Dec. 27, 1921.

Application filed February 15, 1921. Serial No. 445,171.

*To all whom it may concern:*

Be it known that I, LEON L. KAISER, a citizen of the United States, residing at Lodi, in the county of San Joaquin and State of California, have invented new and useful Improvements in Speed-Tables, of which the following is a specification.

The object of my present invention is the provision of a table calculated to enable a locomotive engineer to ascertain at a glance the exact distance and the exact time it takes to make a run between any two stations of a railway.

To the attainment of the foregoing, the invention consists in the improvement as hereinafter described and definitely claimed.

In the accompanying drawing, forming part hereof:—

The figure is a plan view of the speed table constituting the best practical embodiment of my invention of which I am cognizant.

Referring by numerals to the said drawing:—

1 indicates lines arranged in parallelism in spaced relation on the table and extending vertically thereof. 2 indicates horizontal parallel lines that intersect the lines 1, and 3 indicates squares or divisions defined by the said lines 1 and 2, each of the said squares or divisions 3 being arranged in a vertical series and also in a horizontal series, and the squares or divisions being preferably, though not necessarily, of a greater length than height.

Arranged in a diagonal series across the table are the names or stations comprised in a railway, there being the name of one station to one block. Each station named is indicated by 4.

In the vertical columns above and below all of the station names 4 except the end station names 4 are figures such as illustrated, and in the vertical column below the end station name 4 are figures at the left of the table such as illustrated, while in the vertical column above the end station at the right are figures such as illustrated. There are two sets of figures in each square or division 3 of the table, and one set of figures has to do with elapsed time and the other set of figures has to do with mileage.

In the conduct of railroads under modern divisions there is a speed restriction applicable to the movement of freight equipment and another speed restriction applicable to passenger equipment and there are also rules to the effect that inspection of freight train must be made after a train has traversed a certain predetermined distance. It frequently happens that it is difficult to figure out the exact number of minutes it will require to make a run extending through a certain number of miles at a certain speed per hour, and my novel table is designed to be used in connection with the regular time table and to serve the convenience of the engineer when he seeks to ascertain at a glance the distance between two stations and the time it requires to make a run between said stations at a certain rate of speed.

In the production of the table illustrated it is assumed that the distance between the stations, indicated by 4, is ten miles, though in actual practice this would have to be changed to accord with the exact distances between the stations. It is also assumed that the maximum speed for passenger rolling stock or equipment is fifty miles per hour, and that the maximum for freight rolling stock or equipment is twenty-five miles per hour. With this assumption it will be readily understood that by reading the table at right angles from any two station names 4, the figures above the station names will give the miles and running time at fifty miles per hour between said station names, or by reading at right angles on the table below the station names 4, the miles and running time between the stations at twenty-five miles per hour may be ascertained at a glance. This will be better understood when reference is had to the station names "Winnemucca" and "Valmy" for it will be seen that by reading toward the right from "Winnemucca" until the eye rests in the division 3 in the same horizontal plane as the name "Winnemucca" and in the same vertical plane as the station name "Valmy," the figures in said square will indicate miles and the elapsed time required to traverse the distance between the said stations; the upper figures 30, in this case, indicated by 5 indicating the miles, and the lower figures, 36 in this case, indicated by 6 indicating the minutes or hours and minutes as the case may be; it being assumed of course as before indicated that the speed of the rolling stock or equipment is fifty miles per hour. By reading to the left from the station name "Valmy" until the eye rests in the square or division 3 in the same vertical column as the station name "Winnemucca" the reader will find two sets of figures, indicated by 7 and 8, respectively, the upper figures 7, 30 in this case, represents the miles, and the lower figures 8, 1-12 in this case indicating the running time between the stations stipulated at twenty-five miles per hour, the mileage being thirty miles and the time being one hour and twelve minutes as it will be readily understood.

Practical use of a speed table such as illustrated has demonstrated the fact that the table is calculated to save time and labor on the part of locomotive engineer when it is necessary for the engineer to arrive at the computations indicated.

Having described my invention, what I claim and desire to secure by Letters-Patent, is:—

1. A speed table characterized by a diagonal line of spaced station names, side by side upright columns, in each of which is arranged one station name, horizontal columns intersecting the upright columns and in each of which is arranged one station name, and the indicating figures representing miles and time, respectively, arranged in the divisions accorded by the upright and horizontal columns, above and below all of the intermediate station names, and below the station name at one end of the table and above the station name at the opposite end of the table.

2. A speed table characterized by spaced station names and indicating characters representing miles and time respectively; the said station names and indicating characters being relatively arranged to enable an engineer to ascertain at a glance the number of miles between any two stations and the time required to traverse the distance between said stations at a predetermined rate of speed.

3. A speed table characterized by spaced station names and indicating characters representing miles and time respectively; the said station names and indicating characters being relatively arranged to enable an engineer to ascertain at a glance the number of miles between any two stations and the time required to traverse the distance between said stations at a predetermined rate of speed, and to ascertain the distance between any two stations and the time required to traverse such distance at a different predetermined rate of speed.

In testimony whereof I affix my signature.

LEON L. KAISER.